US012170062B2

(12) United States Patent
Yamashita et al.

(10) Patent No.: US 12,170,062 B2
(45) Date of Patent: Dec. 17, 2024

(54) DISPLAY DEVICE AND DRIVING METHOD THEREFOR

(71) Applicant: Everdisplay Optronics (Shanghai) Co., Ltd., Shanghai (CN)

(72) Inventors: Keitaro Yamashita, Shanghai (CN); Jehyen Kang, Shanghai (CN); Xiangshu Li, Shanghai (CN); Fei Shen, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/043,341

(22) PCT Filed: Jun. 18, 2021

(86) PCT No.: PCT/CN2021/100968

§ 371 (c)(1),
(2) Date: Feb. 28, 2023

(87) PCT Pub. No.: WO2022/041966

PCT Pub. Date: Mar. 3, 2022

(65) Prior Publication Data

US 2023/0335055 A1 Oct. 19, 2023

(30) Foreign Application Priority Data

Aug. 28, 2020 (CN) ......................... 202010889868.7

(51) Int. Cl.
*G09G 3/3233* (2016.01)

(52) U.S. Cl.
CPC ... *G09G 3/3233* (2013.01); *G09G 2300/0819* (2013.01); *G09G 2300/0861* (2013.01); *G09G 2320/0247* (2013.01)

(58) Field of Classification Search
CPC ... G09G 2320/0247; G09G 2300/0861; G09G 2300/0819; G09G 3/32332; G09G 3/3233
See application file for complete search history.

(56) References Cited

U.S. PATENT DOCUMENTS

2003/0063078 A1 4/2003 Hanari et al.
2006/0214891 A1 9/2006 Hanari et al.
(Continued)

FOREIGN PATENT DOCUMENTS

CN 102063861 A 5/2011
CN 104778918 A 7/2015
(Continued)

OTHER PUBLICATIONS

1st Office Action dated Aug. 17, 2022 of Chinese Application No. 202010889868.7.
(Continued)

*Primary Examiner* — Abbas I Abdulselam
(74) *Attorney, Agent, or Firm* — Qinghong Xu

(57) ABSTRACT

The present disclosure relates to the field of display technology, and provides a display device and a driving method therefor. The driving method includes: providing a display device including a plurality of sub-pixels, each sub-pixel including an OLED light-emitting element, a light-emitting control transistor configured to transmit a driving current to the OLED light-emitting element, and a reset transistor coupled to an anode of the OLED light-emitting element; inputting a periodic cut-off signal to the light-emitting control transistor; determining the effective light-emitting phase of each frame period for the sub-pixel; and during the effective light-emitting phase of each frame period for the sub-pixel, inputting a reset signal to the reset transistor corresponding to one or more cut-off signal.

10 Claims, 6 Drawing Sheets

(56) References Cited

U.S. PATENT DOCUMENTS

| | | | | |
|---|---|---|---|---|
| 2010/0079430 | A1* | 4/2010 | Yamashita | G09G 3/3233 345/213 |
| 2013/0140538 | A1* | 6/2013 | Fujita | H10K 59/00 257/40 |
| 2018/0083078 | A1* | 3/2018 | Park | H10K 59/1213 |
| 2019/0259327 | A1* | 8/2019 | Li | G09G 3/3233 |
| 2020/0098314 | A1 | 3/2020 | Lin et al. | |
| 2020/0152117 | A1 | 5/2020 | Lin et al. | |
| 2020/0160795 | A1 | 5/2020 | Heo et al. | |
| 2022/0157238 | A1* | 5/2022 | Wang | G09G 3/3233 |

FOREIGN PATENT DOCUMENTS

| | | | |
|---|---|---|---|
| CN | 107068059 | A | 8/2017 |
| CN | 107170407 | A | 9/2017 |
| CN | 108510936 | A | 9/2018 |
| CN | 110264954 | A | 9/2019 |
| CN | 110322841 | A | 10/2019 |
| CN | 111489701 | A | 8/2020 |
| JP | 2004325885 | A | 11/2004 |
| JP | 2005017485 | A | 1/2005 |
| JP | 2010181903 | A | 8/2010 |
| JP | 2010237262 | A | 10/2010 |
| JP | 2014077823 | A | 5/2014 |
| KR | 20190034729 | A | 4/2019 |

OTHER PUBLICATIONS

International Search Report dated Aug. 30, 2021 of International Application No. PCT/CN2021/100968.

Extended European Search Report dated Jul. 8, 2024 of European Application No. 21859810.0.

* cited by examiner

DISPLAY DEVICE AND DRIVING METHOD THEREFOR

The present application is a 35 U.S.C. 371 national phase application of PCT International Application No. PCT/CN2021/100968 filed on Jun. 18, 2021, which PCT International Application claims the priority of Chinese patent application No. 202010889868.7 filed on Aug. 28, 2020, the entrie disclosures of both are incorporated herein by reference.

TECHNICAL FIELD

The present disclosure relates to the field of display technology, in particular to a display device and a driving method therefor.

BACKGROUND

Organic Light-Emitting Diode (OLED) display devices are prone to flicker problems under display conditions with low frame rates. The flicker problem is caused by leakage current or hysteresis voltage. There have been many studies on improving leakage current in the relevant art. The present disclosure mainly focuses on hysteresis voltage.

The driving current $I_{OLED}$ of the OLED light-emitting element is generated according to the following formula (1):

$$I_{OLED}=K(V_{DATA}-ELVDD)^2 \quad (1)$$

where K is the contact value, $V_{DATA}$ is the data voltage, and ELVDD is the power supply voltage. The brightness error $\Delta I_{OLED}$ of the OLED light-emitting element is generated according to the following formula (2):

$$\sqrt{\frac{\Delta I_{OLED}}{I_{OLED}}} = 1 + \frac{\Delta V_{th}}{V_{DATA} - ELVDD} \quad (2)$$

where $\Delta V_{th}$ is the hysteresis voltage. According to the formula (1) and the formula (2), it may be known that the value of ($V_{DATA}$-ELVDD) becomes smaller at low gray levels, and thus the luminance error will increase under the same value of the hysteresis voltage $\Delta V_{th}$. Therefore, the flicker problem becomes more serious under display conditions with low frame rate and low grayscale.

The principle of flicker caused by the hysteresis voltage is that during the initial phase of each frame period, the OLED light-emitting element has a light-emitting delay phenomenon due to the existence of hysteresis voltage, which causes a period of brightness delay of the display brightness in the initial phase of each frame period. Under display conditions with low frame rate and/or low grayscale, this period of brightness delay is perceived by human eyes, resulting in visual flicker.

Especially in display devices using Variable Refresh Rate (VRR) technology, since the sensitivity of human eyes to flicker increases with the decrease of flicker frequency, VRR technology helps to reduce the frame rate to 25 Hz at least, resulting in extremely severe visual flicker.

It should be noted that the information disclosed in the above background section is only used to enhance understanding of the background of the present disclosure, and therefore may include information that does not constitute prior art known to those of ordinary skill in the art.

SUMMARY

In view of above, the present disclosure provides a display device and a driving method therefor to solve the problem of visual flicker.

An aspect of the present disclosure provides a driving method for a display device, comprising steps of: providing a display device, the display device comprising a plurality of sub-pixels, each sub-pixel comprising an OLED light-emitting element, light-emitting control transistor for transmitting a driving current to the OLED light-emitting element, and a reset transistor coupled to the anode of the OLED light-emitting element; inputting a periodic cut-off signal to the light-emitting control transistor; determining an effective light-emitting phase of each frame period for the sub-pixel; and, in the effective light-emitting phase of each frame period for the sub-pixel, inputting a reset signal to the reset transistor corresponding to one or more cut-off signal.

In some embodiments, the step of determining the effective light-emitting phase of each frame period for the sub-pixel includes: inputting an initial reset signal whose period is the frame period to the reset transistor; acquiring the delay light-emitting time of the sub-pixel in response to the initial reset signal; and configuring a phase after the delay light-emitting time in each frame period as the effective light-emitting phase.

In some embodiments, in the step of inputting the reset signal to the reset transistor, determining the input frequency of the reset signal according to the frame period and the delay light-emitting time, so that within each frame period, the brightness delay caused by the delay light-emitting time and the reset signal is invisible in frequency.

In some embodiments, the reset signal is a periodic or aperiodic pulse signal.

In some embodiments, a parasitic capacitance exists between the anode and the cathode of the OLED light-emitting element. In response to the initial reset signal, the driving current charges the parasitic capacitance of the OLED light-emitting element before flowing through the OLED light-emitting element, so that the OLED light-emitting element generates the delay light-emitting time.

In some embodiments, each sub-pixel further includes a driving transistor for generating the driving current, and the driving transistor is connected to the OLED light-emitting element through the light-emitting control transistor.

Another aspect of the present disclosure provides a display device, including a plurality of sub-pixels arranged in a matrix of rows and columns. Each sub-pixel includes: an OLED light-emitting element; a light-emitting control transistor configured to transmit a driving current to the OLED light-emitting element; and a reset transistor, coupled to the anode of the OLED light-emitting element. The light-emitting control transistor receives a periodic cut-off signal. Each frame period of the OLED light-emitting element has an effective light-emitting phase. The reset transistor is configured to receive a reset signal corresponding to one or more cut-off signal in the effective light-emitting phase of each frame period.

In some embodiments, the reset transistor is further configured to receive an initial reset signal whose period is the frame period, the OLED light-emitting element generates a delay light-emitting time in response to the initial reset signal, and the effective light-emitting phase is a phase after the delay light-emitting time in each frame period.

In some embodiments, the input frequency of the reset signal is related to the frame period and the delay light-emitting time, so that within each frame period, the brightness delay resulting from the delay light-emitting time and the reset signal is invisible in frequency.

In some embodiments, each sub-pixel further includes a driving transistor, configured to generate the driving current, and the driving transistor is connected to the OLED light-emitting element through the light-emitting control transistor.

The beneficial effects of the present disclosure at least include the following aspects.

In the effective light-emitting phase of each frame period, the reset transistor is used to reset the OLED light-emitting element corresponding to the black picture generated by the cut-off signal, so that there will be a short brightness delay when the OLED light-emitting element emits light after the black picture. The short brightness delay is further used to supplement the flicker frequency caused by the inherent brightness delay of the OLED light-emitting element in the initial phase of each frame period. This helps to reduce the observability of the overall flicker frequency caused by the brightness delay, thereby eliminating visual flicker.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and together with the description serve to explain the principle of the present disclosure. Apparently, the drawings in the following description are only some embodiments of the present disclosure, and those skilled in the art can obtain other drawings according to these drawings without creative efforts.

DETAILED DESCRIPTION OF THE EMBODIMENTS

Figure 1:
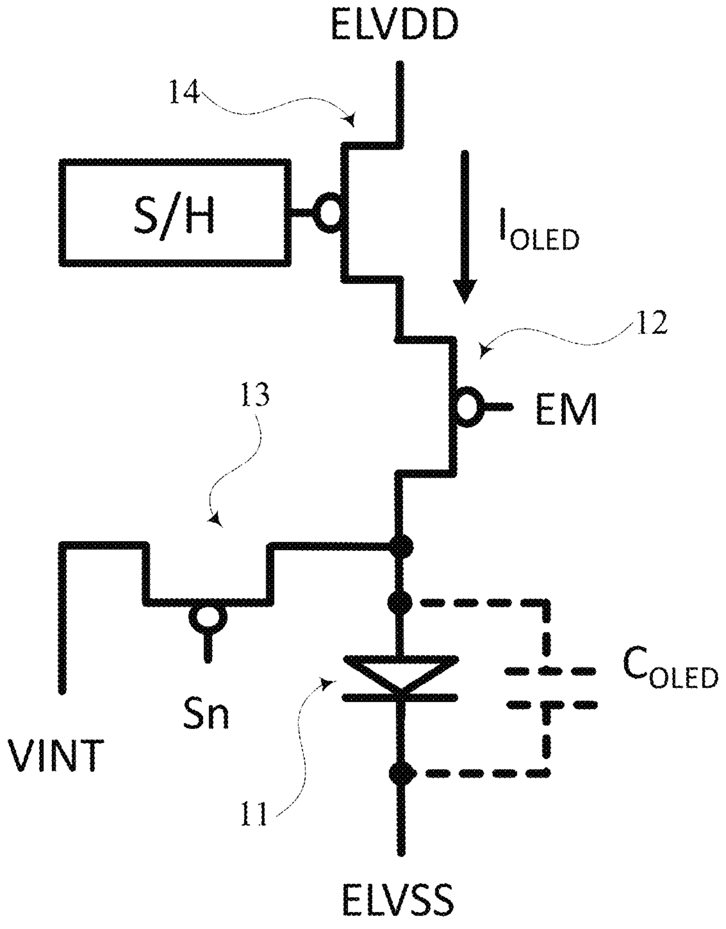
FIG. 1 shows a schematic circuit diagram of a sub-pixel of a display device in an embodiment of the present invention.

Example embodiments will now be described more fully with reference to the accompanying drawings. Example embodiments may, however, be embodied in many forms and should not be construed as limited to the embodiments set forth herein. Rather, these embodiments are provided so that the present disclosure will be thorough and complete, and will fully convey the concept of the example embodiments to those skilled in the art. The same reference numerals denote the same or similar structures in the drawings, and thus their repeated descriptions will be omitted.

Furthermore, the drawings are merely schematic illustrations of the present disclosure and are not necessarily drawn to scale. The same reference numerals in the drawings denote the same or similar parts, and thus repeated descriptions thereof will be omitted. Some of the block diagrams shown in the drawings are functional entities and do not necessarily correspond to physically or logically separate entities. These functional entities may be implemented in software, or in one or more hardware modules or integrated circuits, or in different network and/or processor means and/or microcontroller means.

The step numbers in the following method embodiments are only used to indicate different execution contents, and do not limit the logical relationship and the execution order among the steps.

Figure 2:
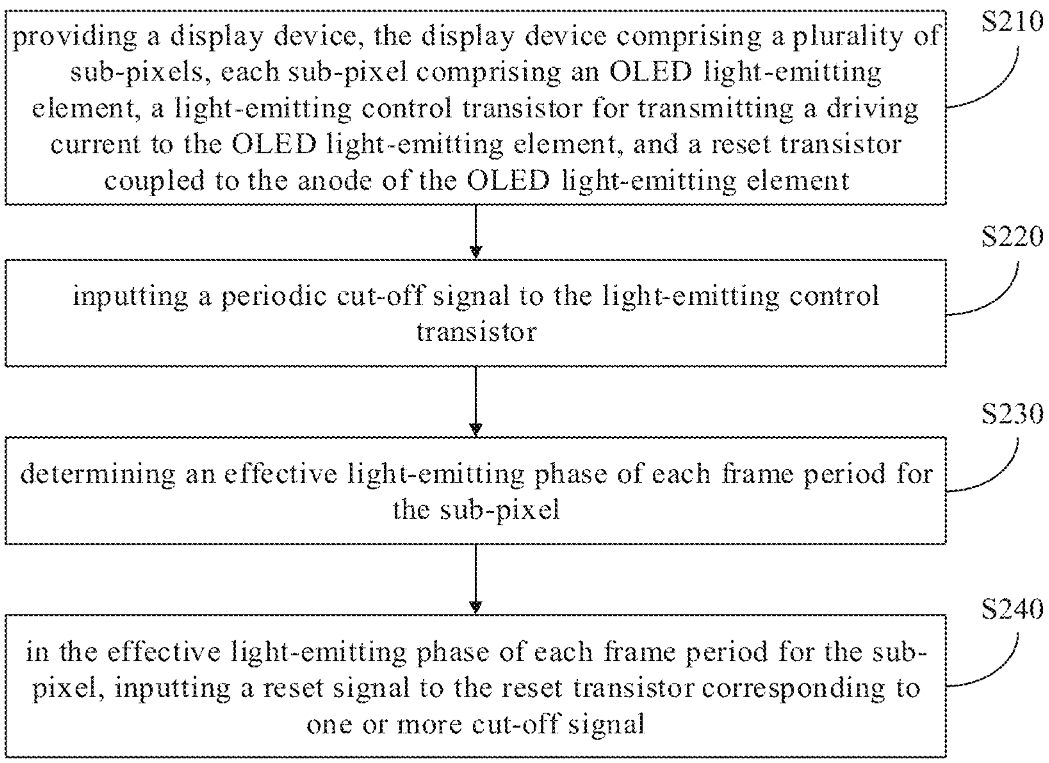
FIG. 2 shows a schematic diagram of steps of a driving method for a display device in an embodiment of the present invention.
Figure 3:
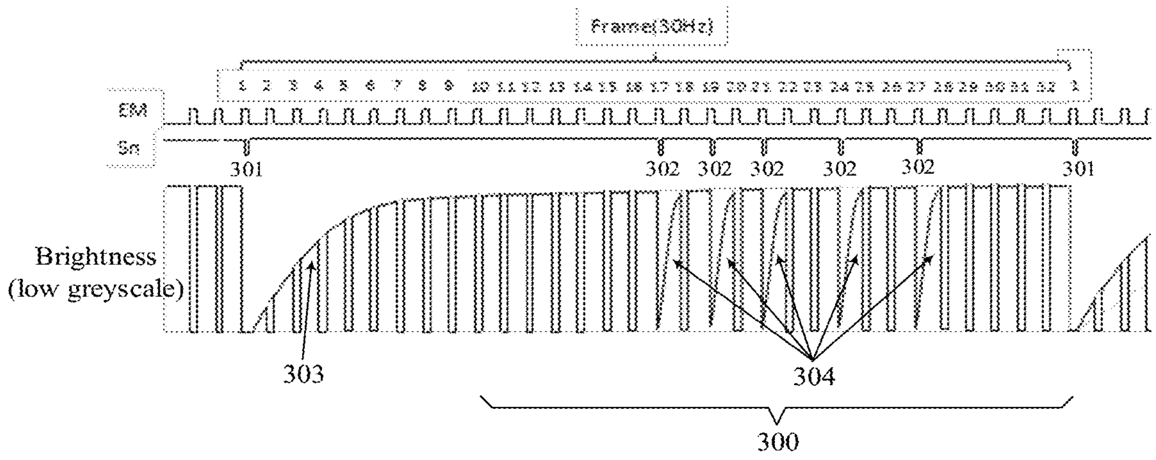
FIG. 3 shows a schematic diagram of the scene of a driving method for a display device in an embodiment of the present invention.

FIG. 1 shows the circuit structure of the sub-pixel of the display device in an embodiment, FIG. 2 shows the main steps of the driving method for the display device in an embodiment, and FIG. 3 shows the implementation scene of the driving method for the display device in an embodiment. Referring to FIG. 2, the driving method for the display device in an embodiment mainly includes the following steps. In step S210, a display device is provided. The display device includes a plurality of sub-pixels, and the circuit structure of each sub-pixel is shown in FIG. 1, including the OLED light-emitting element 11, the light-emitting control transistor 12 that transmits the driving current $I_{OLED}$ to the OLED light-emitting element 11, and the reset transistor 13 coupled to the anode of the OLED light-emitting element 11. In step S220, a periodic cut-off signal is input to the light-emitting control transistor. In step S230, the effective light-emitting phase of each frame period for the sub-pixel is determined. In step S240, in the effective light-emitting phase of each frame period for the sub-pixel, the reset signal is input to the reset transistor corresponding to one or more cut-off signal.

Referring to FIG. 3, the signal EM is a periodic turn-off signal input to the gate of the light-emitting control transistor 12. In an embodiment, the signal EM is a periodic high-level signal, which is used to generate a black picture at a certain frequency in each frame period. Specifically, as shown in FIG. 1 and FIG. 3, when the gate of the light-emitting control transistor 12 receives a high-level signal, the light-emitting control transistor 12 is turned off, and the driving current $I_{OLED}$ cannot be transmitted to the OLED light-emitting element 11 through the light-emitting control transistor 12, thereby causing the brightness of the OLED light-emitting element 11 corresponding to the high level phase of the light-emitting control transistor 12 to be reduced to zero, and generating a black picture. In an embodiment, the signal EM includes 32 high level signals within a frame period (Frame), and the signal EM may be provided to the gate of the light-emitting control transistor 12 in the form of a periodic pulse signal. In an embodiment, the frame period (Frame) is, for example, 30 Hz.

In an embodiment, in the effective light-emitting phase of each frame period, corresponding to the black picture generated by the cut-off signal, the reset transistor is used to reset the OLED light-emitting element, so that a short brightness delay occurs when the OLED light-emitting element emits light after the black picture passes. The short brightness delay is used to supplement the inherent brightness delay of the OLED light-emitting element in the initial phase of each frame period, so that the overall observability of the flicker frequency caused by the brightness delay is reduced, thereby eliminating visual flicker.

In one embodiment, the step of determining the effective light-emitting phase of each frame period for the sub-pixel includes: inputting an initial reset signal whose period is the frame period to the reset transistor; acquiring a delay light-emitting time of the sub-pixel in response to the initial reset signal; and configuring the phase after the delay light-emitting time in each frame period as the effective light-emitting phase.

As shown in FIG. 1 and FIG. 3, the signal Sn is a level signal received by the gate of the reset transistor 13, and the signal Sn includes the initial reset signal 301 whose period is the frame period. There is a parasitic capacitance $C_{OLED}$ between the anode and the cathode of the OLED light-emitting element 11. In response to the initial reset signal 301, the driving current $I_{OLED}$ charges the parasitic capacitance $C_{OLED}$ of the OLED light-emitting element 11 firstly before flowing through the OLED light-emitting element 11, thereby causing the OLED light-emitting element 11 to generate the delay light-emitting time $t_{DELAY}$.

Figure 4:
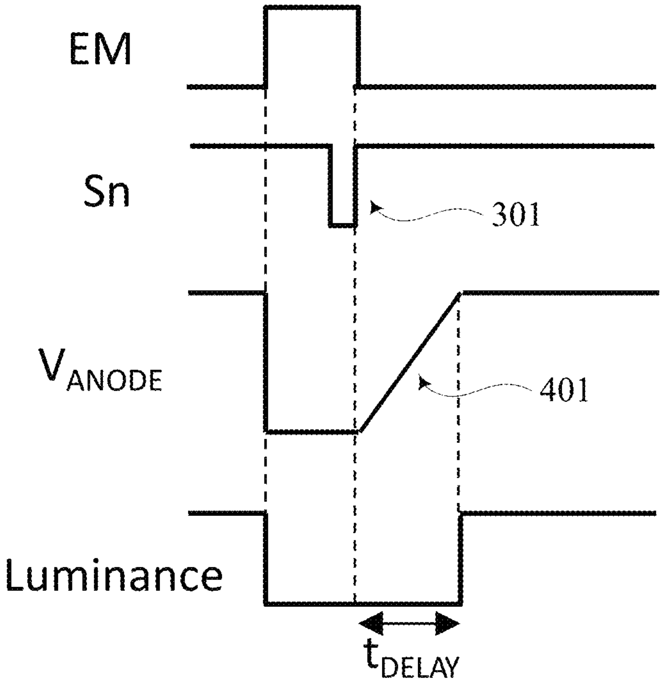
FIG. 4 shows a schematic diagram of the timing sequence where the delay light-emitting time is caused in an embodiment of the present invention.

Specifically referring to the principle shown in FIG. 4, in the initial phase of a frame period, when the initial reset signal 301 is input to the gate of the reset transistor 13, the EM signal is at a high level, and the OLED light-emitting element 11 does not work. The reset transistor 13 is configured to discharge the parasitic capacitance $C_{OLED}$ of the OLED light-emitting element 11, so as to prevent the contrast from decreasing. When the initial reset signal 301 is set to a high level, the EM signal is set to a low level, the reset process ends, and the OLED light-emitting element 11 enters a light-emitting phase. However, due to the existence of the parasitic capacitance $C_{OLED}$, the driving current $I_{OLED}$, that should have flowed through the OLED light-emitting element 11 during the light-emitting phase (that is, flowing from the anode of the OLED light-emitting element 11 to the cathode thereof and caused the OLED light-emitting element 11 to emit light), firstly charges the parasitic capacitance $C_{OLED}$ and then flows through the OLED light-emitting element 11. Thus, the OLED light-emitting element 11 enters the effective light-emitting phase. Therefore, in the initial phase of the frame period, due to the charging process of the parasitic capacitor $C_{OLED}$, there is a certain time delay for light emission of the OLED light-emitting element 11. This is shown in FIG. 4, where the anode voltage $V_{ANODE}$ of the OLED light-emitting element 11 gradually rises to a predetermined value in the initial phase of the frame period, and the brightness Luminance of the OLED light-emitting element 11 has a delay light-emitting time $t_{DELAY}$ in the initial phase of the frame period.

The delay light-emitting time $t_{DELAY}$ is specifically determined according to the following formula (3):

$$t_{DELAY} = \frac{C_{OLED} V_F}{I_{OLED}} \tag{3}$$

wherein $V_F$ is the forward voltage drop of the OLED light-emitting element 11, that is, the voltage value between the anode and the cathode of the OLED light-emitting element 11 for ensuring the normal light emission of the OLED light-emitting element 11.

The delay light-emitting time $t_{DELAY}$ is gray-scale dependent. Under display conditions with high grayscale (high driving current $I_{OLED}$), the delay light-emitting time $t_{DELAY}$ is a very small value and may be ignored.

In FIG. 3, the influence caused by the delay light-emitting time $t_{DELAY}$ is manifested in that a light-emitting delay 303 exists in the light-emitting brightness of the sub-pixel during the initial phase of a frame period (Frame). Under display conditions with low grayscale and low frame rate, the inherent brightness delay 303 caused by the hysteresis voltage of the sub-pixel will cause visual flicker. Therefore, in an embodiment, in each frame period, a certain short brightness delay 304 is inserted after the inherent brightness delay 303, so as to increase the occurrence frequency of the brightness delay in each frame period. Thereby, the human eye's sensitivity to flicker caused by the brightness delay is decreased, thus achieving the effect of visual flicker elimination.

The way of inserting a short brightness delay, as described in step S240 above, is to input a reset signal corresponding to one or more cut-off signal to the reset transistor during the effective light-emitting phase of each frame period of the sub-pixel. For example, as shown in FIG. 3, in the effective light-emitting phase 300 of a frame period (Frame) of the sub-pixel, five reset signals 302 are input to the reset transistor through the signal Sn. The five reset signals 302 correspond to five phase-spaced cut-off signals. The reset signal 302 may be a periodic or non-periodic pulse signal, and its specific input frequency is determined according to the frame period and the delay light-emitting time, so that in each frame period, the brightness delay generated by the delay light-emitting time and the reset signal is invisible in frequency. The reset signal 302 is the same in function as the initial reset signal 301, and both are signals capable of realizing the reset operation of the OLED light-emitting element 11.

As shown in FIG. 1, FIG. 3, and FIG. 4, when the gate of the reset transistor 13 receives the reset signal 302, the reset transistor 13 will discharge the parasitic capacitance $C_{OLED}$ of the OLED light-emitting element 11; and when the reset signal 302 ends, the signal Sn is set high, and the signal EM is set low, the driving current $I_{OLED}$ charges the parasitic capacitor $C_{OLED}$ firstly, and then flows through the OLED light-emitting element 11 to emit light. Therefore, after each reset signal 302 of the OLED light-emitting element 11, there will be a short brightness delay 304 in its light-emitting brightness. The short brightness delay 304 increases the total occurrence frequency of the brightness delay in each frame period, thereby reducing the visual flicker sensitivity caused by the inherent brightness delay 303, and rendering the overall flicker variation within each frame period to be visually invisible.

Under display conditions with high grayscale, there is almost no inherent brightness delay of the sub-pixel. That is, the delay light-emitting time in the initial phase of each frame period is very small. Thus, the input frequency of the reset signal determined according to the frame period and the delay light-emitting time is very small. This means that the above-mentioned driving method will not affect the display conditions with high grayscale. Similarly, under display conditions with high frame rate, the input frequency of the reset signal determined according to the frame period and the delay light-emitting time is very small. This means that the above-mentioned driving method will not affect the display conditions with high frame rate.

In the above driving method, some conventional method principles and circuit structures are not described, which should not be regarded as a limitation to the present disclosure. For example, as shown in FIG. 1, each sub-pixel circuit is connected to power supply voltage ELVDD and ELVSS, and each sub-pixel circuit also includes a driving transistor 14 for generating a driving current $I_{OLED}$. The driving transistor 14 is connected to the OLED light-emitting element 11 through the light-emitting control transistor 12.

Figure 5:
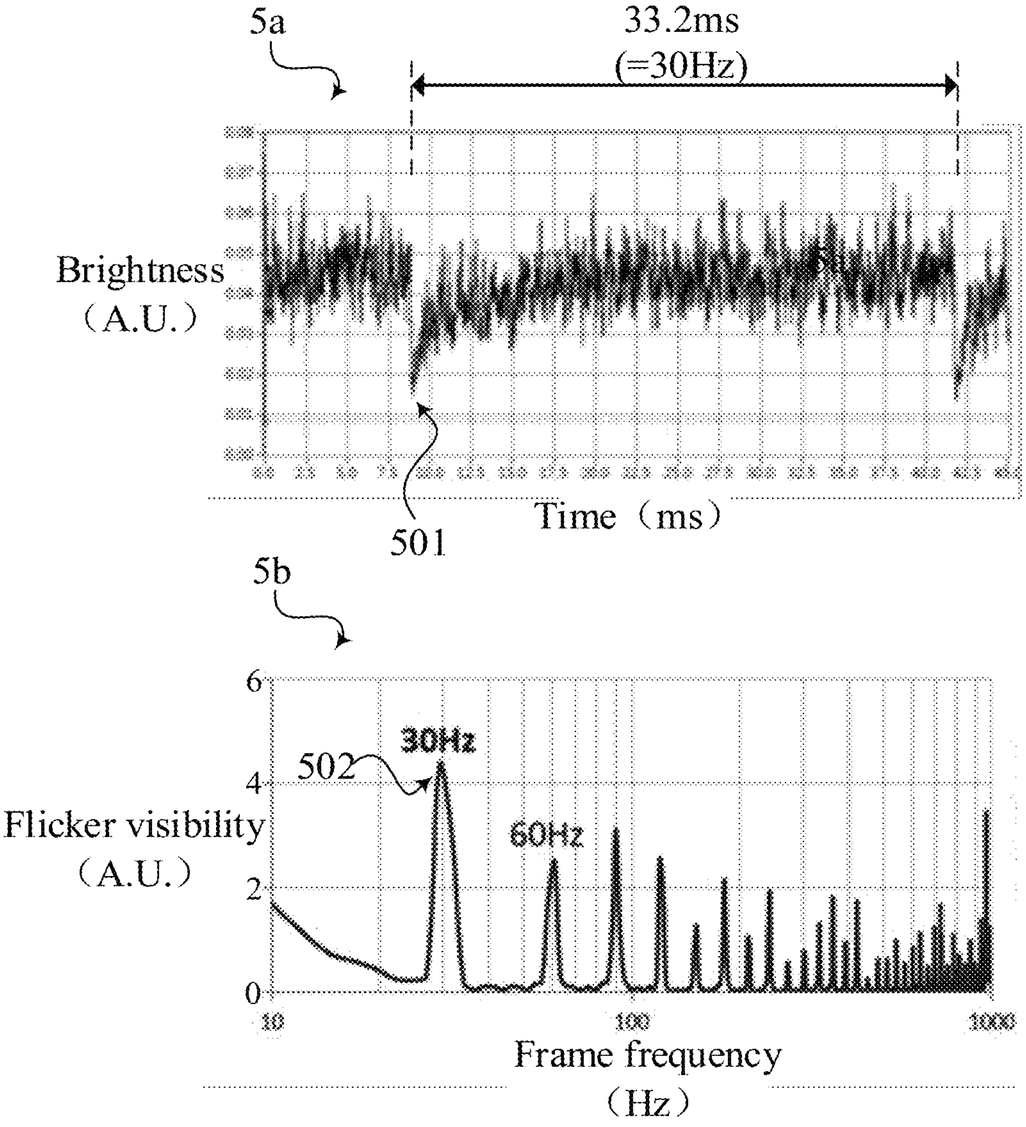
FIG. 5 shows the brightness change curve and the flicker visibility curve of a display device where a traditional driving method is adopted.
Figure 6:
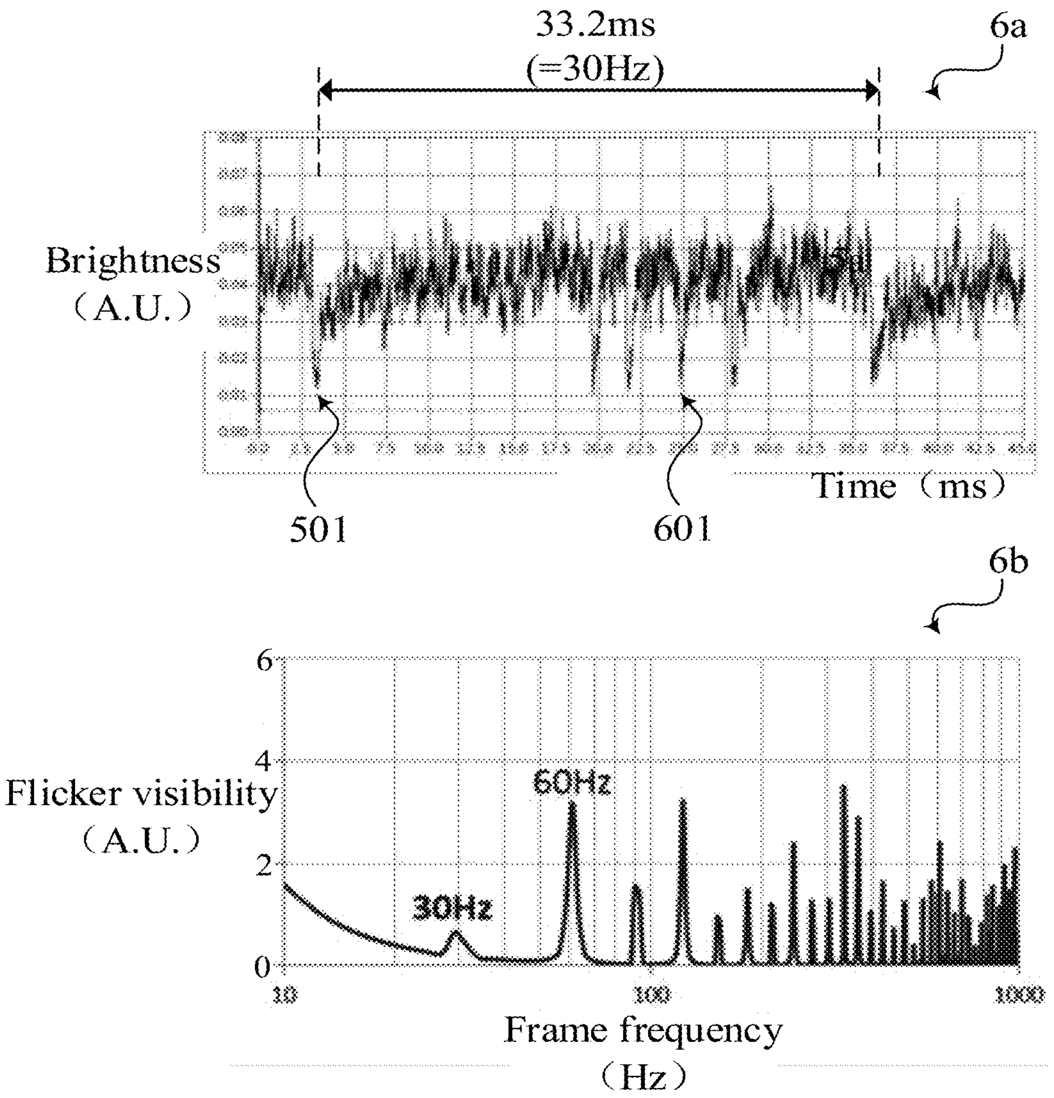
FIG. 6 shows the brightness change curve and the flicker visibility curve of a display device where the driving method of the present disclosure is adopted.

FIG. 5 shows the brightness change curve and the flicker visibility curve of a display device using a traditional driving method, and FIG. 6 shows the brightness change curve and the flicker visibility curve of a display device where the driving method of the present disclosure is adopted. Referring to FIG. 5, the frame frequency of the display device is 30 Hz, and the grayscale thereof is 46, for example. In the initial phase of a frame period, the display device has an inherent brightness delay, which is shown as a sudden drop 501 in the brightness change curve 5*a*. But in the subsequent phase of the frame period, the trend of the brightness change curve 5*a* is relatively stable. Under display conditions with low frame rate and low grayscale, the sudden drop 501 in brightness at the initial phase of each frame period will cause a strong visual experience, which is manifested as a sharp rise 502 in the flicker visibility curve 5*b*, resulting in a poor visual flicker for perception.

Referring to FIG. 6, also under the display condition with a frame frequency of 30 Hz and a grayscale of 46, when the driving method of the above-mentioned embodiment is adopted, a short brightness delay is inserted in the effective light-emitting phase of each frame period through the additional reset signal, which is shown as a brightness drop 601 in the brightness change curve 6*a*. This causes the occurrence frequency of the brightness drop (including one brightness drop 501 and multiple brightness drops 601) in each frame period to be increased, thereby relieving visual feeling. That is, in the flicker visibility curve 6*b*, the flicker visibility corresponding to the frame rate of 30 Hz is greatly reduced, thereby achieving the effect of visual flicker elimination under display conditions with low frame frequency and low grayscale. Therefore, when the display device is equipped with VRR technology and G-SYNC technology, for example, in some game applications, the situation of visual flicker is greatly improved. At display frame rates of 60 Hz and higher, flicker visibility will not be observed by human eyes.

To sum up, through the above-mentioned driving method, in the effective light-emitting phase of each frame period of the sub-pixel, corresponding to the black picture generated by the cut-off signal, the reset transistor is used to reset the OLED light-emitting element, so that a short brightness delay is generated when the OLED light-emitting element emits light after the black picture passes. The short brightness delay is used to supplement the flicker frequency caused by the inherent brightness delay of the OLED light-emitting element in the initial phase of each frame period, thereby reducing the overall observability of the flicker frequency caused by the brightness delay, and achieving the effect of visual flicker elimination.

An embodiment of the present invention also provides a display device, which includes a plurality of sub-pixels arranged in a matrix of rows and columns. Referring to FIG. 1, each sub-pixel includes: an OLED light-emitting element 11; a light-emitting control transistor 12, configured to transmit the driving current $I_{OLED}$ to the OLED light-emitting element 11; and a reset transistor 13, coupled to the anode of OLED light-emitting element 11. The gate of the light-emitting control transistor 12 receives a periodic cut-off signal, generates a continuous black picture. The OLED light-emitting element 11 has an effective light-emitting phase in each frame period. The reset transistor 13 receives a reset signal corresponding to one or more cut-off signal during the effective light-emitting phase of each frame period, so that a short brightness delay occurs when the OLED light-emitting element 11 emits light after the black picture passes. The short brightness delay is used to supplement the flicker frequency caused by the inherent brightness delay of the OLED light-emitting element 11 in the initial phase of each frame period, so that the overall observability of the flicker frequency caused by the brightness delay is reduced, thereby achieving the effect of visual flicker elimination.

Each sub-pixel also includes a driving transistor 14 for generating a driving current $I_{OLED}$, and the driving transistor 14 is connected to the OLED light-emitting element 11 through the light-emitting control transistor 12.

Further, the reset transistor also receives an initial reset signal whose period is the frame period, the OLED light-emitting element generates a delay light-emitting time in response to the initial reset signal, and the effective light-emitting phase is a phase after the delay light-emitting time in each frame period. The input frequency of the reset signal is specifically related to the frame period and the delay light-emitting time, so that the brightness delay generated by the delay light-emitting time and the reset signal in each frame period is invisible in frequency.

The display device in this embodiment is driven by the driving method of the above embodiment, so as to achieve the effect of visual flicker elimination. For specific principles, reference may be made to the descriptions of the foregoing embodiments, which will not be repeated here.

To sum up, according to the display device and the driving method therefor of the present disclosure, in the effective light-emitting phase of each frame period of the sub-pixel, corresponding to the black picture generated by the cut-off signal, the reset transistor is used to reset the OLED light-emitting element, so that a short brightness delay occurs when the OLED light-emitting element emits light after the black picture passes. The short brightness delay is used to supplement the flicker frequency caused by the inherent brightness delay of the OLED light-emitting element in the initial phase of each frame period, so that the overall observability of the flicker frequency caused by the brightness delay is reduced, thereby achieving the effect of visual flicker elimination.

The above content is a further detailed description of the present disclosure in conjunction with specific preferred embodiments, and it cannot be assumed that the specific implementation of the present disclosure is limited to these descriptions. For those of ordinary skill in the technical field of the present disclosure, without departing from the concept of the present disclosure, some simple deduction or replacement can be made, which should be regarded as belonging to the protection scope of the present disclosure.

The invention claimed is:

1. A driving method for a display device, comprising steps of:

providing a display device comprising a plurality of sub-pixels, wherein each sub-pixel comprises an OLED light-emitting element, a light-emitting control transistor configured to transmit a driving current to the OLED light-emitting element, and a reset transistor coupled to an anode of the OLED light-emitting element;

inputting a plurality of periodic cut-off signals to the light-emitting control transistor;

determining an effective light-emitting phase of each frame period for the sub-pixel; and during the effective light-emitting phase of each frame period for the sub-pixel, inputting a reset signal to the reset transistor at the same timing as one or more of the plurality of cut-off signals.

2. The driving method according to claim 1, wherein the step of determining the effective light-emitting phase of each frame period for the sub-pixel comprises:

inputting an initial reset signal to the reset transistor, wherein a period of the initial reset signal is the frame period;

acquiring a delay light-emitting time of the sub-pixel in response to the initial reset signal; and configuring a phase after the delay light-emitting time in each frame period as the effective light-emitting phase.

3. The driving method according to claim 2, wherein during the step of inputting the reset signal to the reset transistor, an input frequency of the reset signal is determined according to the frame period and the delay light-emitting time, so that in each frame period, a brightness delay resulting from the delay light-emitting time and the reset signal is invisible in frequency.

4. The driving method according to claim 3, wherein the reset signal is a periodic or non-periodic pulse signal.

5. The driving method according to claim 2, wherein a parasitic capacitance exists between the anode and a cathode of the OLED light-emitting element, and in response to the initial reset signal, the driving current charges the parasitic capacitance of the OLED light-emitting element before flowing through the OLED light-emitting element, so that the OLED light-emitting element generates the delay light-emitting time.

6. The driving method according to claim 1, wherein each sub-pixel further comprises a driving transistor for generating the driving current, and the driving transistor is connected to the OLED light-emitting element through the light-emitting control transistor.

7. A display device, comprising a plurality of sub-pixels arranged in a matrix of rows and columns, wherein each sub-pixel comprises:

an OLED light-emitting element;

a light-emitting control transistor, configured to transmit a driving current to the OLED light-emitting element; and a reset transistor, coupled to an anode of the OLED light-emitting element, wherein the light-emitting control transistor is configured to receive a plurality of periodic cut-off signals, each frame period of the OLED light-emitting element has an effective light-emitting phase, and the reset transistor is configured to receive a reset signal at the same timing as one or more of the plurality of cut-off signals during the effective light-emitting phase of each frame period.

8. The display device according to claim 7, wherein the reset transistor is further configured to receive an initial reset signal, wherein a period of the initial reset signal is the frame period, and the OLED light-emitting element is configured to generate a delay light-emitting time in response to the initial reset signal, wherein the effective light-emitting phase is a phase after the delay light-emitting time in each frame period.

9. The display device according to claim 8, wherein an input frequency of the reset signal is related to the frame period and the delay light-emitting time, so that during each frame period, a brightness delay resulting from the delay light-emitting time and the reset signal is invisible in frequency.

10. The display device according to claim 7, wherein each sub-pixel further comprises:

a driving transistor, configured to generate the driving current, wherein the driving transistor is connected to the OLED light-emitting element through the light-emitting control transistor.

* * * * *